Aug. 27, 1946.　　　　P. H. BRACE　　　　2,406,318
SUPERVISORY APPARATUS
Original Filed March 4, 1941　　2 Sheets-Sheet 1

WITNESSES:
C. J. Weller.

INVENTOR
Porter H. Brace.
BY
F. W. Lyle
ATTORNEY

Aug. 27, 1946.　　　　P. H. BRACE　　　　2,406,318
SUPERVISORY APPARATUS
Original Filed March 4, 1941　　　2 Sheets-Sheet 2

WITNESSES:
C. J. Weller.

INVENTOR
Porter H. Brace.
BY F. W. Lyle.
ATTORNEY

Patented Aug. 27, 1946

2,406,318

UNITED STATES PATENT OFFICE 2,406,318

SUPERVISORY APPARATUS

Porter H. Brace, Forest Hills, Pa., assignor to Westinghouse Electric Corporation, East Pittsburgh, Pa., a corporation of Pennsylvania Original application March 4, 1941, Serial No. 381,672. Divided and this application December 3, 1942, Serial No. 467,731

5 Claims. (Cl. 88—14)

This invention relates to devices useful for the control of metallurgical processes, and more particularly to supervisory apparatus for indicating the progress of chemical reactions due to combustion at high temperatures.

This is a division of my Patent 2,339,754 issued January 25, 1944. This application is directed toward specific embodiments for the control of metallurgical processes described in the original patent above-identified.

The primary object of this invention is to utilize the radiation properties accompanying combustion for indicating the progress of the combustion process.

Another object of the invention is to analyze the combustion process by means of the radiation in such manner as to produce an instantaneous visual indication proportional to the intensity of the radiation and at the same time provide an indication of a standard radiation for comparative observance.

A further object of the invention is to produce visual indication at a rate higher than the time constant of the persistence of vision in rapid succession of the radiation properties of a radiating source including its spectral components and the rate of change of the radiation received at an observation point at any instant.

Another object of the invention is to provide an apparatus for generating a series of electrical impulses proportional to the radiation characteristics and spectral components of the radiation to be analyzed and proportional to the radiation of a standard source, and utilizing said impulses in a predetermined order and sequence of time to form a pattern on the screen of a cathode ray oscilloscope.

Other objects and advantages will be apparent from the following description of the invention pointed out in particularity by the appended claims and taken in connection with the accompanying drawings in which:

Figure 6:
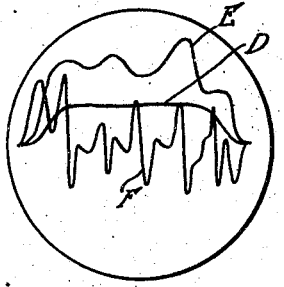
Figure 5:
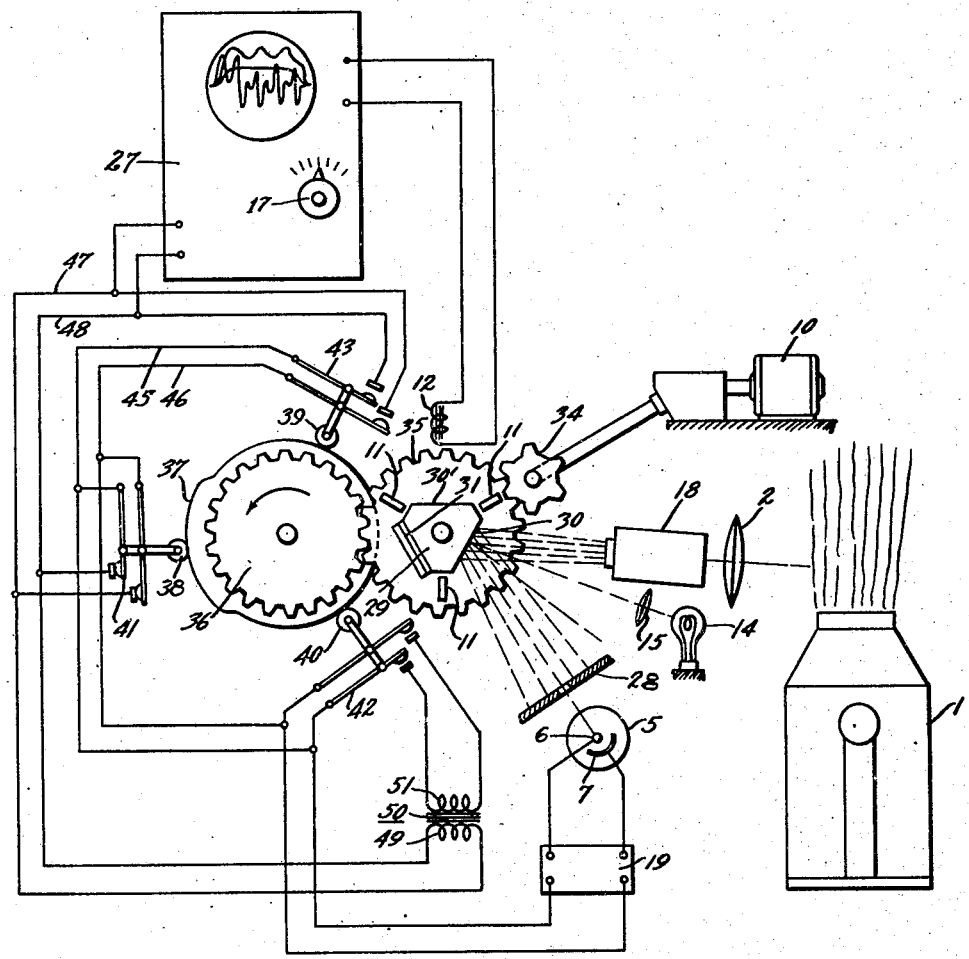

Fig. 5 is a schematic view of the apparatus for analyzing simultaneously the total radiation characteristics, the spectral radiation, and the rate of change of the radiation incident on a point of observation, e. g. a slit at the focus of the optical system cooperating with a photo-cell; and, Fig. 6 illustrates the pattern obtained in accordance with the operation of the arrangement shown in Fig. 5.

In metallurgical operations involving accelerated oxidation reactions, for example, in combustion processes involving high temperatures, the radiations from the flames of gaseous or solid products are frequently depended upon as a means for estimating the progress of the reaction in order to decide upon the measures for controlling the process. For example, in producing steel by means of the Bessemer converter, it is the practice to depend upon the trained eye of the individual in charge of the control of the operation. Very accurate timing is necessary to maintain satisfactory uniformity in the product and the inevitable human error frequently leads to so-called "off heats" resulting in considerable economic losses. In accordance with the invention herein described a continuous indication can be effected of the changing distribution of the radiation from the flame of a converter.

Figure 1:
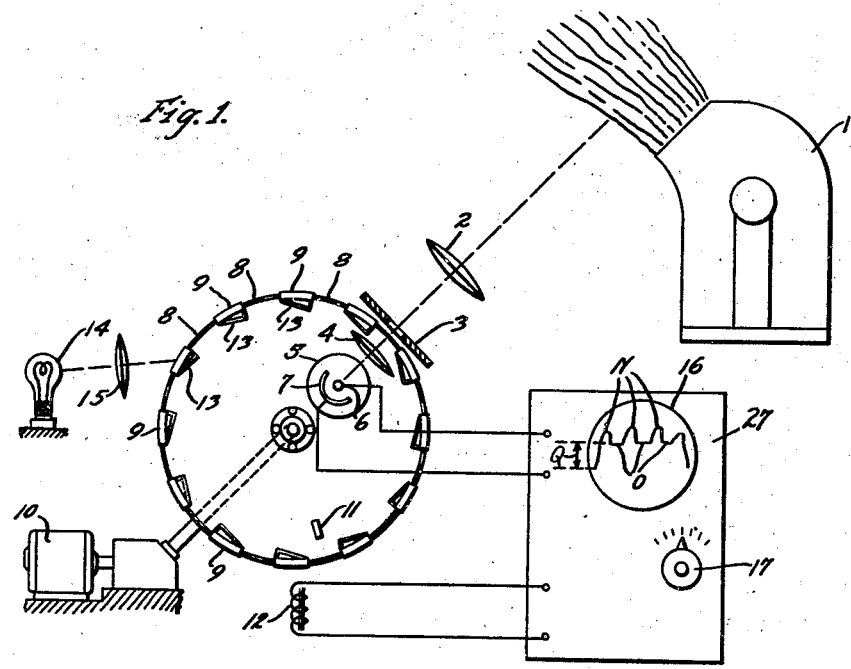
Figure 1 is a schematic view of one embodiment of an apparatus for analyzing the general radiation of a flame.

Referring to Fig. 1, a Bessemer converter 1 is schematically indicated, the flame of which emits visible, infrared and ultraviolet radiations. These radiations are passed through an optical system indicated by the lens 2 and through a suitable diaphragm 3 and are directed upon a second lens 4 which focuses the beam on a photo-cell 5. The anode and cathode elements 6 and 7, respectively of the cell 5 are connected to the vertical sweep circuit of a cathode ray oscilloscope 21.

Oscilloscopes of this type are standard instruments for comparing various properties of alternating currents and serve as a useful tool in the fields of research and industry. The invention does not concern itself with the particular type of oscilloscope and therefore its mechanical or electrical features need not be described in detail. It is to be understood that the oscilloscope contains elements for producing an adjustable linear time axis for the horizontal sweep of the cathode ray and that the currents to be traced cause vertical movement of the cathode ray.

A scanning mechanism comprising a series of alternating light filtering elements 8, and opaque members 9 is interposed between the diaphragm 3 and the lens 4. The filter members and the opaque members are so arranged as to form a revolving drum which may be roated at a uniform speed by the motor 10 through suitable gearing. In order to synchronize the sweep of the oscilloscope with the rotation of the scanning mechanism, a small permanent magnet 11 is carried thereby and is arranged to cooperate with an inductance coil 12 to deliver a voltage pulse to the sweep control of the oscilloscope on each revolution of the scanning mechanism.

The opaque members 9 acting as shutters for the light from the radiation of the flame, carry reflecting surfaces 13, which are at such an angle as to reflect upon the photo-cell 5 the radiation from a standard source shown here by the lamp 14, the illumination of which is focused by means of the lens 15 upon the reflecting surfaces when one of them obstructs the opening of the diaphragm 3. The illumination is arranged by proper physical placement of the light source 14 in such manner that an opaque member 9 will cut off the light beam when a filtering element 8 is directly opposite the opening of the diaphragm 3. The number of opaque members 9 around the circular support is so arranged that whenever a filtering element is placed directly opposite the opening in the diaphragm 3, an opaque member cuts off the light from the source 14. On the other hand, whenever an opaque member 9 is directly opposite the opening in the diaphragm 3 and thereby cuts off the light entering from the lens 2, a filtering element 8 will be so positioned that light from the source 14 must pass therethrough. The light beam passing through the filter 8 being directed to the center of the opening in the diaphragm 3 encounters a reflector surface 13 from which it is then reflected and directed through the lens 4 onto the photo-cell 5. As the drum revolves the next instant, a filtering member will take the place of the opaque member before the opening in the diaphragm 3, and at the same time an opaque member 9 will take the place of the filter member 8 before the lens 15 and thereby cut off the light from the source 14. It is clearly seen that in alternate succession the photo-cell will be energized from the light source to be analyzed and the standard source 14. Each of the light filtering elements 8, has different predetermined spectral transmittance and they are so arranged that as the scanning mechanism rotates each successive filter progressively completes the desired spectrum.

Figure 3:
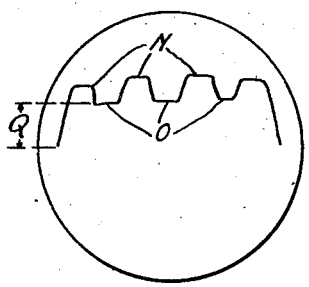
Fig. 3 shows the resultant pattern in accordance with the operation of the embodiment shown in Fig. 1.

In the operation of the apparatus above described when the scanning mechanism is rotating the photo-cell receives interrupted illumination whose magnitudes depend upon the intensity of the radiation of the flame and the transmission coefficients of the filters. The photo-cell also receives a series of impulses originating from the standard source 14 in alternate succession. This results in a pattern on the oscilloscope screen 16 as shown in Fig. 3 where the series of deflections N of the cathode ray beam differ in amplitude alternatingly from a series of deflections O. The former are due to the energization of the photocell from the radiation source to be analyzed and the latter from the constant source 14. For the purpose of comparison the sensitivity of the oscilloscope may be adjusted by the control 17 until the deflections due to the standard radiation reach some predetermined amplitude which is indicated by the mark Q. The standard source 14 may conveniently be a tungsten filament lamp with means for accurately measuring and adjusting the filament current. The motor 10 for driving the scanning mechanism should have a reasonably constant speed.

Figure 2:
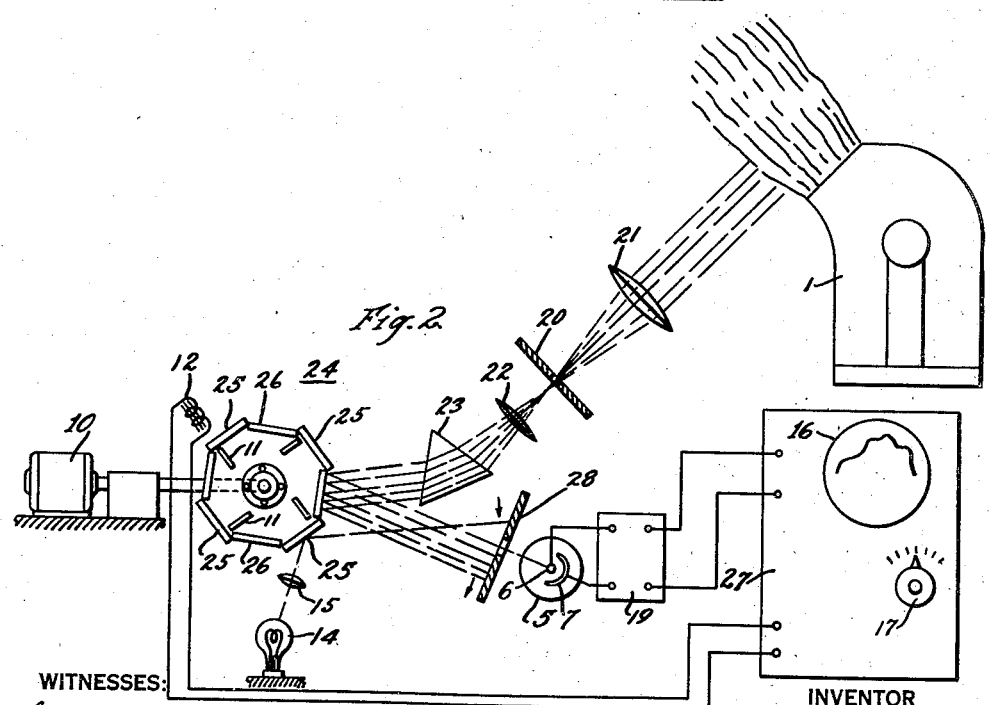
Fig. 2 is a modified arrangement for analyzing the spectral radiation of a flame.

The above arrangement provides continuous spectral analysis of a chosen portion of the spectrum of a flame. Greater discrimination may be obtained through the use of suitable prisms or gratings to develop the "line" spectrum of the radiation. By this is meant the successive viewing of the spectral lines of the flame as they are developed by a refracting prism, diffraction grating or equivalent optical element. A different type of scanning system is employed for this purpose as shown in Fig. 2. Radiation from the converter flame is focused on a slit 20 by a suitable optical system represented here by the lens 21. The light is focused by another lens 22 upon a refracting prism 23, from which it is directed on the scanning mechanism 34. The latter consists of a series of reflecting surfaces 25 having a certain angular position. Alternating with these surfaces are reflecting surfaces 26 which have a different angular position for the purpose which shall be described hereinafter. By means of the prism 23 the light is broken up into its spectrum and is then thrown upon a light gate 28 behind which is a photo-electric cell 5. The output of the latter is connected to the vertical deflecting circuit of a cathode ray oscilloscope in the same manner as shown in Fig. 1. An amplifier 19 may be interposed between the photo-cell 5 and the oscillograph 27 if the output of the photo-cell should not be of sufficient magnitude to energize the oscilloscope. The rotation of the scanning mechanism by the motor 10 causes the spectral radiation to sweep across the opening of the light gate 28 every time one of the reflecting surfaces 25 is in proper alignment therewith. Thus the radiation reaching the photo-cell varies with time during the movement of the spectrum across the opening of the light gate and in such a manner that it is dependent upon the spectral distribution of the radiation. The alternate reflectors 26 of the scanning mechanism are so positioned that they deflect the spectrum away from the light gate while reflecting the light from a standard source shown here by the lamp 14 in cooperation with the lens 15 upon the light gate as the scanning mechanism rotates.

Figure 4:
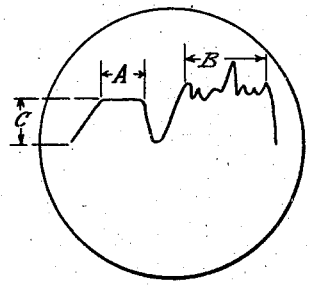
Fig. 4 illustrates the pattern resultant from the operation of the arrangement of Fig. 2.

The timing of the oscilloscope sweep is controlled as in Fig. 1 by a series of permanent magnets 11 and inductance 12 so that the oscilloscope sweep returns to its starting point after the passage of each pair of deflecting surfaces. The result is that the oscilloscope receives the series of impulses from the photo-cell evoked alternately by the light from the standard source and the radiation from the converter flame. The resultant pattern on the oscilloscope screen will be of the type shown in Fig. 4 where the portion A represents a steady deflection due to the standard radiation and the portion B a variable deflection due to the passage of successive spectral regions of the flame radiation across the light gate. In the operation the oscilloscope sensitivity is to be adjusted to keep the deflection due to the standard radiation at some predetermined amplitude value as indicated by the mark "C."

It frequently happens that significant lines of the spectrum are obscured by general radiation which gives a more or less continuous background of high intensity. Such radiation might arise from incandescent solid particles in suspension in the flame gases. In order to separate the lines from the continuous background, and provide a flexible arrangement in which the general radiation and the spectral lines can be simultaneously observed, together with some indication of the progress of reaction, the arrangement shown in Fig. 5 can be utilized. By this modification of the invention the following sequence of operation will take place automatically:

1. One complete sweep of the oscilloscope records the illumination from a standard source;
2. The next sweep records the "spectral" variation of the total radiation from the flame as a whole.
3. A third sweep records the rate of change of radiation reaching the photo-cell slit and thus serves to emphasize spectral lines with respect to the general background.

Radiation from the source shown herein as the flame of a Bessemer converter 1 is focused by means of lens 2 on a spectroscope 18 from which the dispersed light emerges and is directed upon a scanning mechanism comprising a polyhedral mirror 29 having two identical facets 30 and 30' and another facet 31 disposed in a different angular position. The mirror 29 is driven by a motor 10 by means of gears 34 and 35. The gear drive is merely for the purpose of illustration and other suitable driving mechanisms may be employed. Another gear 36 similar in size to gear 35 is in mesh with the latter and rotates a cam 37 upon which ride the rollers 38, 39 and 40 each actuating a switch 41, 43 and 42, respectively. The moving contacts of the switches 41, 42 and 43 are connected in parallel by means of conductors 45 and 46 and connect to the output of the photo-cell 5 through a suitable amplifier 19. The stationary contacts of the switches 41 and 43 are connected in parallel by means of conductors 47 and 48 and connect to the input circuit of the oscilloscope 7 and also to the secondary winding 49 of a transformer 50 the primary winding 51 of which is connected to the stationary contacts of the switch 42.

The synchronization of the oscilloscope sweep is effected as previously described by means of magnets 11 carried by the gear 35 cooperating with inductance coil 12. The facets 30 and 30' of the mirror 29 are so arranged that the light from the spectroscope 18 is reflected thereby upon the light gate 28 behind which is the photo-cell 5, whereas the facet 31 is in such angular position that it reflects the light from the standard source 14 focused by the lens 15 upon the light gate 28.

The mirror 29 is so geared to the cam 37 that the switches 41, 42 and 43 are closed in succession during the intervals when the photo-cell is illuminated. In Fig. 5 the position illustrates the instant when the record of the general radiation of the flame is being indicated, the facet 30 sweeping over the light gate, and the switch 41 being closed. With the rotation as indicated by the arrow the next event will be the indication of the spectral lines as distinguished from the general radiation. The radiation from the spectroscope will be reflected by the facet 30' of the mirror 29 while the cam 37 will have closed the switch 42 so that the impulse from the photo-electric cell 5 will be transmitted to the cathode ray tube through the transformer 50. The transformer, due to its characteristics, will develop signals which are proportional to the rate of change of the radiation at any instant rather than to its intensity. As the rotation continues the next occurrence is that the facet 31 is placed in operative relation between the light gate 28 and the source 14, sweeping the light gate by the standard radiation. At this time the switch 43 is in the closed position whereas switches 42 and 41 are open. The output of the photo-cell 5 will be connected directly through conductors 45 and 46, the stationary contacts of the switch 43, and conductors 48 and 47 to the input of the oscilloscope.

The operation is repeated in uniform sequence, and the resultant pattern on the oscilloscope screen will be as shown in Fig. 6, comprising three distinctive cathode ray sweep lines, D being that of the radiation of the standard source, E a record of the spectral lines of the general radiation, and F, a record of the rate of change of the radiation when the transformer is in operation.

I claim as my invention:

1. In a device for analyzing combustion processes by means of the radiation characteristics of the flame, means for dispersing said radiation to obtain the spectral distribution of said flame, a rotating polyhedral mirror having a series of facets, at least one at a certain angular position and others at a different angular position, a light gate, a photo-electric cell cooperating therewith, means including said dispersing means for directing the spectral radiation of said flame upon one set of facets and therefrom upon said light gate, a source of constant radiation of known value, means for directing said last-mentioned radiation upon said other set of facets and therefrom upon said light gate whereby the rotation of said mirror causes energization of said cell in succession at rapidly recurring intervals in accordance with the spectral distribution of said flame and in accordance with the radiation of said source, means for indicating the relative magnitudes of the currents generated by said cell comprising a cathode ray oscilloscope and means for synchronizing the sweep of said oscilloscope with the movement of said mirror.

2. In an apparatus for analyzing combustion processes by means of the radiation characteristics of the flame, an optical system for dispersing the radiation into its elementary spectrum, a rotating polyhedral mirror having at least two consecutive reflecting surfaces at a certain angular position and another surface at a different angular position, a light gate, a photo-electric cell cooperating therewith, said optical system, said light gate and said two consecutive reflecting surfaces being so related that the rotation of said mirror causes energization of said photocell by action of each of said two consecutive reflecting surfaces through said gate by successive wave lengths of the spectral radiation of said flame in uniform time sequence, a source of standard radiation, means for causing said last-mentioned radiation to be reflected from said surface having a different angular position upon said gate and thereby energizing said cell after successive energizations from said spectral radiation, a cathode ray oscilloscope, a circuit interconnecting the output of said cell with the input of said oscilloscope means for synchronizing the rotation of said mirror with the linear sweep of said oscilloscope, and means included in said circuit for changing the output current of said photo-cell during the time interval when one of said consecutive reflecting surfaces transmits radiation to said cell to vary said current in proportion with the rate of change of intensity of successive wave lengths of said spectral radiation.

3. In an apparatus for analyzing combustion processes by means of the radiation characteristics of the flame, an optical system for dispersing the radiation into its elementary spectrum, a rotating polyhedral mirror having at least two consecutive reflecting surfaces at a certain angular position and another surface at a different angular position, a light gate, a photo-electric cell cooperating therewith, said optical system, said light gate and said two consecutive reflecting surfaces being so related that the rotation of said mirror causes energization of said photo-cell by action of each of said two consecutive reflecting surfaces through said gate by successive wave lengths of the spectral radiation of said flame in uniform time sequence, a source of standard radiation, means for causing said last-mentioned radiation to be reflected from said surface having a different angular position upon said gate and thereby energizing said cell after successive energizations from said spectral radiation, a cathode ray oscilloscope, a circuit interconnecting the output of said cell with the input of said oscilloscope, means for synchronizing the rotation of said mirror with the linear sweep of said oscilloscope, and means comprising a transformer for changing the output current of said photo-cell during the time interval when one of said consecutive reflecting surfaces transmits radiation to said cell to vary said current in proportion with the rate of change of intensity of successive wave lengths of said spectral radiation.

4. In an apparatus for analyzing combustion processes by means of the radiation characteristics of the flame, an optical system for dispersing the radiation into its elementary spectrum, a rotating polyhedral mirror having at least two consecutive reflecting surfaces at a certain angular position and another surface at a different angular position, a light gate, a photo-electric cell cooperating therewith, said optical system, said light gate and said two consecutive reflecting surfaces being so related that the rotation of said mirror causes energization of said photo-cell by action of each of said two consecutive reflecting surfaces through said gate by successive wave lengths of the spectral radiation of said flame in uniform time sequence, a source of standard radiation, means for causing said last-mentioned radiation to be reflected from said surface having a different angular position upon said gate and thereby energizing said cell after successive energizations from said spectral radiation, a cathode ray oscilloscope, a circuit comprising means having an output voltage responsive to the rate of change of input current thereto and a plurality of switching means conjointly operable with the rotation of said mirror for connecting during the sweep interval of one of said consecutive surfaces the output of said cell directly with the input of said oscilloscope and for interposing at the sweep interval of said next consecutive surface said means having an output voltage responsive to the rate of change of input current thereto between the output of said cell and said oscilloscope and for restoring said direct connection at the sweep interval of said surface having different angular position.

5. In an apparatus for analyzing combustion processes by means of radiation characteristics, an optical system adapted to transmit radiation along a path which embodies means for dispersing radiation into a spectrum beam, a source of standard radiation, a radiation-responsive device in said path and means for alternately causing radiation from said source to strike said device and said beam to be swept across said device.

PORTER H. BRACE.